May 27, 1952   E. ZOERLEIN ET AL   2,598,632
ENGINE MOUNT

Filed Sept. 26, 1946   2 SHEETS—SHEET 1

E. J. LUCE
E. ZOERLEIN
W. C. VINCENT
INVENTORS

BY

ATTORNEYS.

May 27, 1952     E. ZOERLEIN ET AL     2,598,632
ENGINE MOUNT

Filed Sept. 26, 1946     2 SHEETS—SHEET 2

E. J. LUCE.
E. ZOERLEIN
W. C. VINCENT
    INVENTORS

ATTORNEYS.

Patented May 27, 1952

2,598,632

UNITED STATES PATENT OFFICE 2,598,632

ENGINE MOUNT

Emil Zoerlein, Dearborn, and William C. Vincent and Edward J. Luce, Detroit, Mich., assignors to Ford Motor Company, Dearborn, Mich., a corporation of Delaware Application September 26, 1946, Serial No. 699,542

2 Claims. (Cl. 248—2)

This application is concerned in general with a means for quickly and accurately securing one object to another, and more specifically with a means for securing an aircraft engine to the fuselage.

It is essential in aircraft work that the engine be secured to the fuselage accurately and rigidly and that the fastening means employed be proof against accidental loosening due either to defective attachment or vibration. The conventional method of attaching the aircraft engine to the fuselage has been by bolting with all of the nuts equipped with a safety wire to prevent loosening by vibration during operation. To insure the exact positioning of the engine in relationship to the fuselage it has been necessary to keep the clearance around the fastening bolts to a minimum. These necessary precautions consume much time and labor in changing engines in aircraft.

Particularly in combat service, it is a decided advantage to be able to remove a damaged or defective engine and install a replacement with a minimum of labor and as quickly as possible. However, speed cannot be achieved at the expense of an accurate, rigid and reliable mounting of the replacement engine on the fuselage. Applicants have devised the structure described herein to enable a maintenance crew to install a replacement engine in an aircraft quickly and reliably and with the help of only standard tools.

Accordingly it is an object of this invention to provide a means for quickly and accurately attaching an aircraft engine to the fuselage.

It is a further object of this invention to provide an airplane engine mount which is adjustable to compensate for inevitable irregularities in manufacture.

It is a further object of this invention to provide an airplane engine mount in which the possibility of accidental release in service due to defective installation is reduced to a minimum.

With these and other objects in view, the invention consists in the arrangement, construction and combination of the various parts of the improved structure as described in the specification, claimed in the claims and illustrated in the accompanying drawings, in which:

Figure 1:
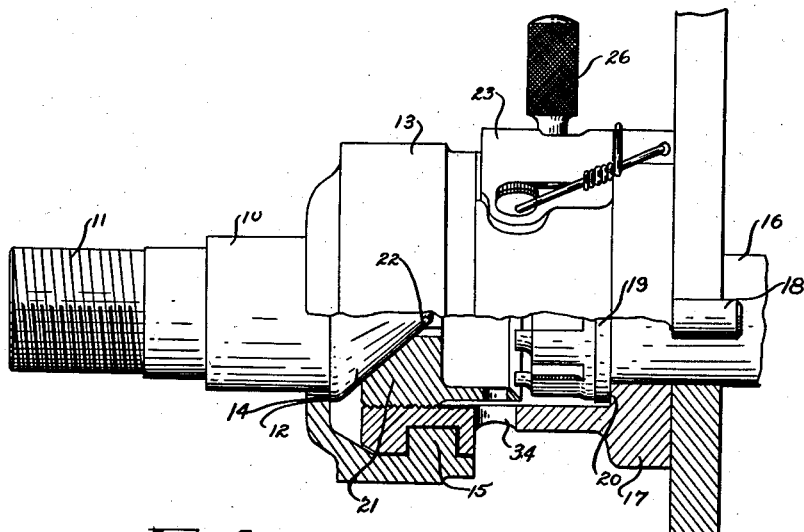
Figure 1 is an elevation, partially in section, of the assembled engine mount.

Turning to Figure 1, a stud bolt 10 is provided to secure the engine mount to the aircraft engine. Threads 11 engage directly in a suitably threaded opening in the engine. Stud bolt 10 is provided with a tapered conical head 12 for a purpose which will become apparent as the description proceeds. The conical head 12 is preferably tapered at an angle of forty-five degrees. Before stud bolt 10 is threaded into the aircraft engine, it is placed inside nut 13. This nut 13 engages the shoulder 14 on tapered head 12. Nut 13 is provided with a pair of cams, one of which is shown at 15.

Bolt 16 is employed to secure screw member 17 to the fuselage. Locator pins 18 fix screw member 17 in the correct position with respect to the fuselage. Bolt 16 coacts with nut 19 which rests upon shoulder 20 in screw member 17. The motor end of screw member 17 is threaded internally to support adjustable bearing block 21. The motor end of bearing block 21 is provided with a conical section 22, also tapered at forty-five degrees and designed to receive and coact with conical tapered head 12 of stud bolt 10.

Figure 2:
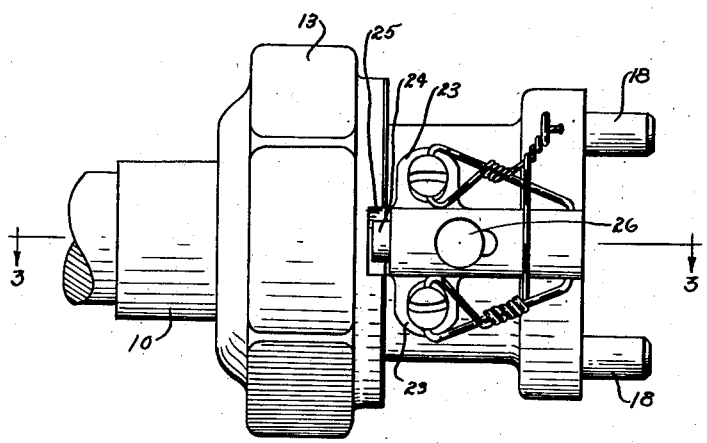
Figure 2 is a plan view of the assembled engine mount.

As shown in Figures 1 and 2, saddle 23 is secured to screw member 17 and houses the locking apparatus used to make certain that accidental release of the fastening is impossible. This locking apparatus simultaneously secures nut 13 and adjustable bearing block 21 against rotation. Nut 13 is secured against rotation relative to screw member 17 by tongue 24 which is spring urged into notch 25 cut in nut 13. The locking apparatus is actuated by knob 26.

Figure 3:
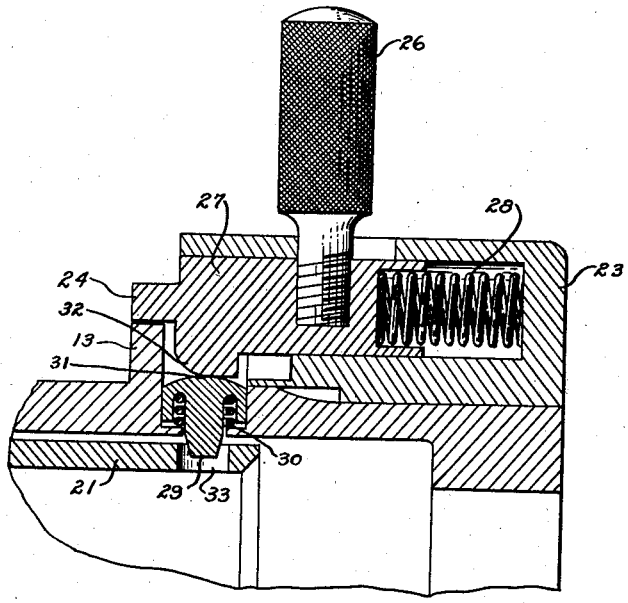
Figure 3 is a sectional view of applicants' locking device in the locked position taken on the line 3—3 in Figure 2.
Figure 4:
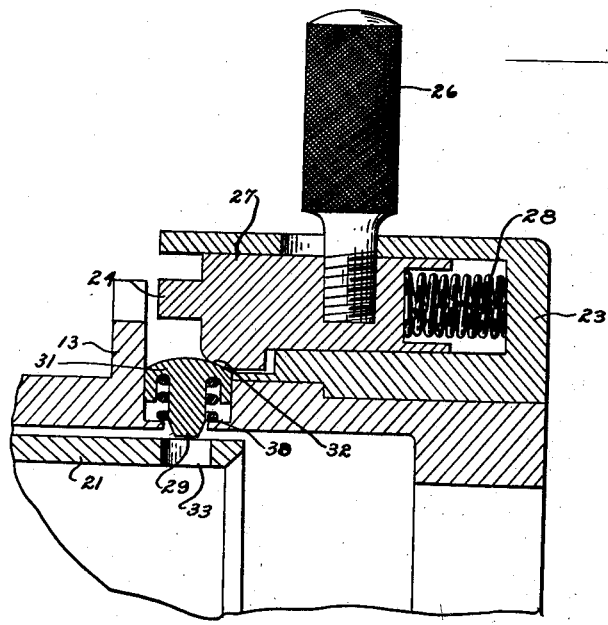
Figure 4 is a sectional view of applicants' locking device in the unlocked position taken on the line 3—3 in Figure 2.

The actual structure of the locking apparatus is readily understood from a consideration of Figures 3 and 4. Figure 3 is a cross section of the locking apparatus taken on line 3—3 in Figure 2 and showing the mechanism in the locked position. Figure 4 is similar to Figure 3, except that it shows the mechanism in the unlocked position.

In these figures, detent 27 is urged to the left by spring 28. Tongue 24 is an extension of detent 27. Detent 27 is moved against the tension of spring 28 by knob 26. Locking pin 29 is urged upwards by spring 30 and carries rounded head 31. Rounded head 31 coacts with a similarly rounded surface 32 on detent 27. This pin in the locked position projects through aperture 33 in adjustable bearing block 21.

To join the two sections of the engine mount, nut 13 and its associated parts are brought into the proper relationship with screw member 17 and its associated parts. Nut 13 is rotated so that cams 15 engage the threads in screw member 17. These cams and threads are so formed that the initial relative rotation of nut 13 and screw member 17 causes a relative axial motion of these two parts towards each other. When the axial motion of the screw member 17 and nut 13 is complete and tapered head 12 is in snug contact with conical section 22, the cams 15 engage a plateau on the thread in screw member 17 and some farther rotation of nut 13 is possible without farther relative axial movement of nut 13 and screw member 17. In this position also tapered head 12 of stud bolt 10 should be in snug engagement with the conical section 22 of adjustable bearing block 21. If this fit is not sufficiently snug, adjustable bearing block 21 is rotated through slot 34 (Figure 1) until the desired fit is obtained. The detent 27 is now allowed to move to the left until tongue 24 rests in notch 25 thereby preventing any relative motion of nut 13 and screw member 17. This movement of detent 27 forces locking pin 29 into opening 33 in adjustable bearing block 21, thereby securing this member against accidental rotation.

From the foregoing it will be seen that there has been provided a quick acting engine mount permitting rapid engine exchange. In this structure it is impossible to neglect to lock the adjustable bearing block since such locking is a prerequisite to the locking of the main nut. Unless the concealed lock on the adjustable bearing block is in the proper position, it is impossible to secure the visible lock.

While applicants' structure has been particularly described with reference to the mounting of aircraft engines, it is obvious that it can readily be adapted to any situation requiring quick and dependable attachment and detachment of two articles.

What is claimed is:

1. In an aircraft engine mount, a fastening member adapted to be secured directly to the engine and having a shoulder and a conical tapered head the apex of which is directed away from the engine, a nut surrounding the fastening member and coacting with the shoulder and having internal threads, an internally and externally threaded fuselage member adapted to be secured to the aircraft fuselage, and an adjustable bearing block carried on the internal threads of the fuselage member and having a conical tapered face adapted to coact with the head of the fastening member.

2. The structure recited in claim 1 in which the nut and the adjustable bearing block are each provided with individual locking means.

EMIL ZOERLEIN.
WILLIAM C. VINCENT.
EDWARD J. LUCE.

REFERENCES CITED

The following references are of record in the file of this patent:

UNITED STATES PATENTS

| Number | Name | Date |
|---|---|---|
| 1,166,979 | Gallet | Jan. 4, 1916 |
| 1,478,154 | Weir | Dec. 18, 1923 |
| 1,815,442 | Masury | July 21, 1931 |
| 1,885,692 | Dugan | Nov. 1, 1932 |
| 1,892,065 | Markey | Dec. 27, 1932 |
| 2,010,877 | Morell | Aug. 13, 1935 |
| 2,401,449 | Yates | June 4, 1946 |